US007406551B2

(12) United States Patent  (10) Patent No.: US 7,406,551 B2
Ishihara  (45) Date of Patent: Jul. 29, 2008

(54) BUS CONFIGURATION CIRCUIT

(75) Inventor: Yuzo Ishihara, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 165 days.

(21) Appl. No.: 10/844,542

(22) Filed: May 13, 2004

(65) Prior Publication Data
US 2005/0080960 A1   Apr. 14, 2005

(30) Foreign Application Priority Data
Sep. 26, 2003   (JP)   ............... 2003-334783

(51) Int. Cl.
*G06F 13/00*   (2006.01)
(52) U.S. Cl. ..................... 710/104; 710/110
(58) Field of Classification Search ............ 710/8, 710/9, 17, 18, 110, 104; 714/1, 2, 48
See application file for complete search history.

(56) References Cited

U.S. PATENT DOCUMENTS

| | | | | |
|---|---|---|---|---|
| 5,297,292 | A * | 3/1994 | Morimoto et al. ............ | 710/113 |
| 6,101,584 | A | 8/2000 | Satou et al. | |
| 6,654,839 | B1 | 11/2003 | Hashimoto | |
| 6,857,035 | B1 * | 2/2005 | Pritchard et al. ............. | 710/110 |
| 6,996,655 | B1 * | 2/2006 | Lee et al. .................... | 710/308 |
| 2002/0188794 | A1 * | 12/2002 | Koh et al. .................... | 710/310 |
| 2003/0145144 | A1 * | 7/2003 | Hofmann et al. ............ | 710/110 |
| 2004/0044812 | A1 * | 3/2004 | Holm et al. .................. | 710/110 |
| 2004/0103230 | A1 * | 5/2004 | Emerson et al. ............. | 710/110 |
| 2004/0123036 | A1 * | 6/2004 | Hammitt et al. ............. | 711/131 |

FOREIGN PATENT DOCUMENTS

| | | |
|---|---|---|
| JP | 10-134008 | 5/1998 |
| JP | 2000276358 A | * 10/2000 |

OTHER PUBLICATIONS

AMBA Specification. Revision 2.0. ARM Limited. May 13, 1999.*

* cited by examiner

*Primary Examiner*—Mark Rinehart
*Assistant Examiner*—Thomas J. Cleary
(74) *Attorney, Agent, or Firm*—Volentine & Whitt, P.L.L.C.

(57) ABSTRACT

A bus configuration circuit includes a first group having a first master module, a first slave module and a first bus module group; a second master module and a second slave module disposed outside the first group and connected thereto by a second bus module group; and a third slave module disposed outside the first group. A first control signal is output from the first bus module group indicative of whether an access destination of the first master module is the first slave module. A second control signal is output from the first slave module indicative of the accessed status of the first slave module. The third slave module consequently outputs a third control signal responsive to the first and second control signals.

9 Claims, 7 Drawing Sheets

BUS CONFIGURATION CIRCUIT

CROSS REFERENCE TO RELATED APPLICATION

The present application claims priority under 35 U.S.C. §119 to Japanese Patent Application No. 2003-334783, filed Sep. 26, 2003, which is herein incorporated by reference in their entirety for all purposes

BACKGROUND OF THE INVENTION

1. Field of the Invention

The present invention relates to a bus configuration circuit suitable for use in an information processing system, which comprises a plurality of master modules, a plurality of slave modules and bus modules which connect among these master and slave modules.

2. Description of the Related Art

There has recently been in the limelight, a platform design wherein IPs (Intellectual Properties) each having functions necessary for the periphery of a platform in which basic modules such as a CPU (microprocessor), a memory, an interrupt controller, etc. are built therein and which guarantees the reliability of operation, are disposed by using the platform. Since the IPs (Intellectual Properties) corresponding to functional blocks are disposed on the periphery of the platform via buses or bus modules according to purposes upon the platform design, each single design becomes unnecessary and the shortening of delivery times can be realized. The execution of the above-described design has been described in, for example, the following Patent Document 1.

Japanese Laid Open Patent Application No. 2000-276358.

However, there has recently been a demand for execution of multiprocessoring or multilayer busing or the like with a view toward improving the performance of an information processing system. Thus, there has been a need for newly considering a platform corresponding to the multiprocessoring or multilayer busing. FIG. 3 shows a conventional system configurational example using an AHB (Advanced High-Performance Bus) of AMBA (Advanced Microcontroller Bus Architecture) corresponding to general bus specs. A schematic block diagram of a system configurational example where multiprocessoring has been done, is shown in FIG. 6, and a block diagram of a system configurational example where multilayer busing has been done, is shown in FIG. 7.

As shown in FIG. 6, there is known an example for realizing multiprocessoring by using a platform 2 shown in FIG. 3 in plural form as one method of multiprocessoring. A selector 301 performs access arbitration among a master module M211 provided within a platform 210, a master module M221 provided within a platform 220 and a master module M12 and obtains access to a slave module S212, S213, S222, S223, S23 or S24. An access response issued from the slave module S212 or S213 provided within the platform 210, the slave module S222 or S223 provided within the platform 220, or the slave module S23 or S24 is selected by a selector 302, which is returned to all the master modules. In this case, the platform 220 and the platform 210 are precisely the same as the platform 2 shown in FIG. 3. Since the already-existing basic modules are reused, system design in a short period is enabled.

Further, the multilayer busing is a system wherein bus layers are respectively assigned to a plurality of master modules as referred to as a multilayer AHB, access arbitrations among the respective layers and respective slave modules are individually performed so that plural master module-to-slave module accesses can be performed simultaneously, thereby improving system performance.

FIG. 7 illustrates a bus configurational example using the platform 2 and multilayer AHB shown in FIG. 3. The platform 210, a master module M12 and a master module M13 are respectively assigned to bus layers of a layer 317, a layer 318 and a layer 319, as shown in FIG. 7. A selector 314 performs arbitration among accesses from the respective layers and thereby obtains access to a slave module S21 or S22 provided within the platform 210. A selector 315 also performs arbitration among accesses from the respective layers and thereby obtains access to a slave module S23. Also a selector 316 performs arbitration among accesses from the respective layers and thereby obtains access to a slave module S24. Access responses issued from the slave modules S21, S22, S23 and S24 are respectively selected by selectors 311, 312 and 313, which in turn are returned to the master modules M11, M12 and M13 respectively. When simultaneous access from the different master modules to the same slave module occurs, an access arbitration wait takes place by the selector 314, 315 or 316, so that the master modules are capable of merely performing access in order. However, plural master module-to-slave module accesses can simultaneously be done unless the simultaneous access to the same slave module occurs.

However, when such multiprocessoring as shown in FIG. 6 is performed where the platform 2 takes such a configuration as shown in FIG. 3, the slave modules S212 and the slave module S222 exist in the same address space on a system because the platform 220 is just the same module as the platform 210. Similarly, the slave module S213 and the slave module S223 exist in the same address space, thus causing a problem that the system fails to operate in the normal manner.

When such multilayer busing as shown in FIG. 7 is performed where the platform 210 takes such a configuration as shown in FIG. 3, multilayering is carried out outside the platform 210 but only one bus right exists in the platform 210. Therefore, when the master module M12 or M13 provided outside the platform 210 obtains access to the slave modules S21 and S22 provided within the platform 210, it cannot obtain access thereto unless the bus right in the platform 210 is obtained. Thus, while the master module M12 or M13 is being accessed to the slave modules S21 and S22, accessing is awaited even if an access destination of the master module M11 provided within the platform 210 is not intended for the slave module S21 or S22. Therefore, a problem arose in that a performance improvement enough for the master module M11 could not be obtained.

SUMMARY OF THE INVENTION

Thus, a problem resides in that the circumstances under which the master module provided outside the platform 2 obtains access to its corresponding slave module provided within the platform 2, exist. The present invention has been made to solve the foregoing problems. Therefore, the present invention aims to provide a bus configuration circuit capable of normally operating even where signal lines from the master module provided outside the platform 2 to the slave module provided within the platform 2 are eliminated.

According to one aspect of the present invention, there is provided a bus configuration circuit, comprising:

a first group that consists of a first master module, a first slave module controlled by the first master module, and a first bus module group that connects the first master module and the first slave module;

a second master module and a second slave module disposed outside the first group and connected to the first group via the first bus module group by a second bus module group;

a first control signal outputted from the first bus module group according to whether an access destination of the first master module corresponds to the first slave module;

a second control signal outputted from the first slave module through the first bus module group according to accessed circumstances of the first slave module; and a third slave module that outputs a third control signal to the first master module, the second master module, the first slave module and the second slave module via the second bus module group or the first bus module group in response to the first control signal and the second control signal.

Owing to the use of the bus configuration circuit according to the present invention, it is possible to prevent the occurrence of access from the second master module to the first slave module, eliminate the need for access from the second master module to the first group owing to the placement of the second slave module outside the first group, and transfer the circumstances of access of the first master module to the first slave module to the second slave module, third slave module and second master module to thereby confirm the completion of access from the first master module to the first slave module, thus enabling multiprocessing. In the case of multilayering, access waits produced more than necessary can be reduced and an improvement in performance can be realized. Since the number of terminals of a platform and signal lines can be reduced as compared with the prior art, a reduction in the whole area and a reduction in power consumption can be achieved.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENT

A preferred embodiment of the present invention will hereinafter be described with reference to the accompanying drawings.

Figure 1:
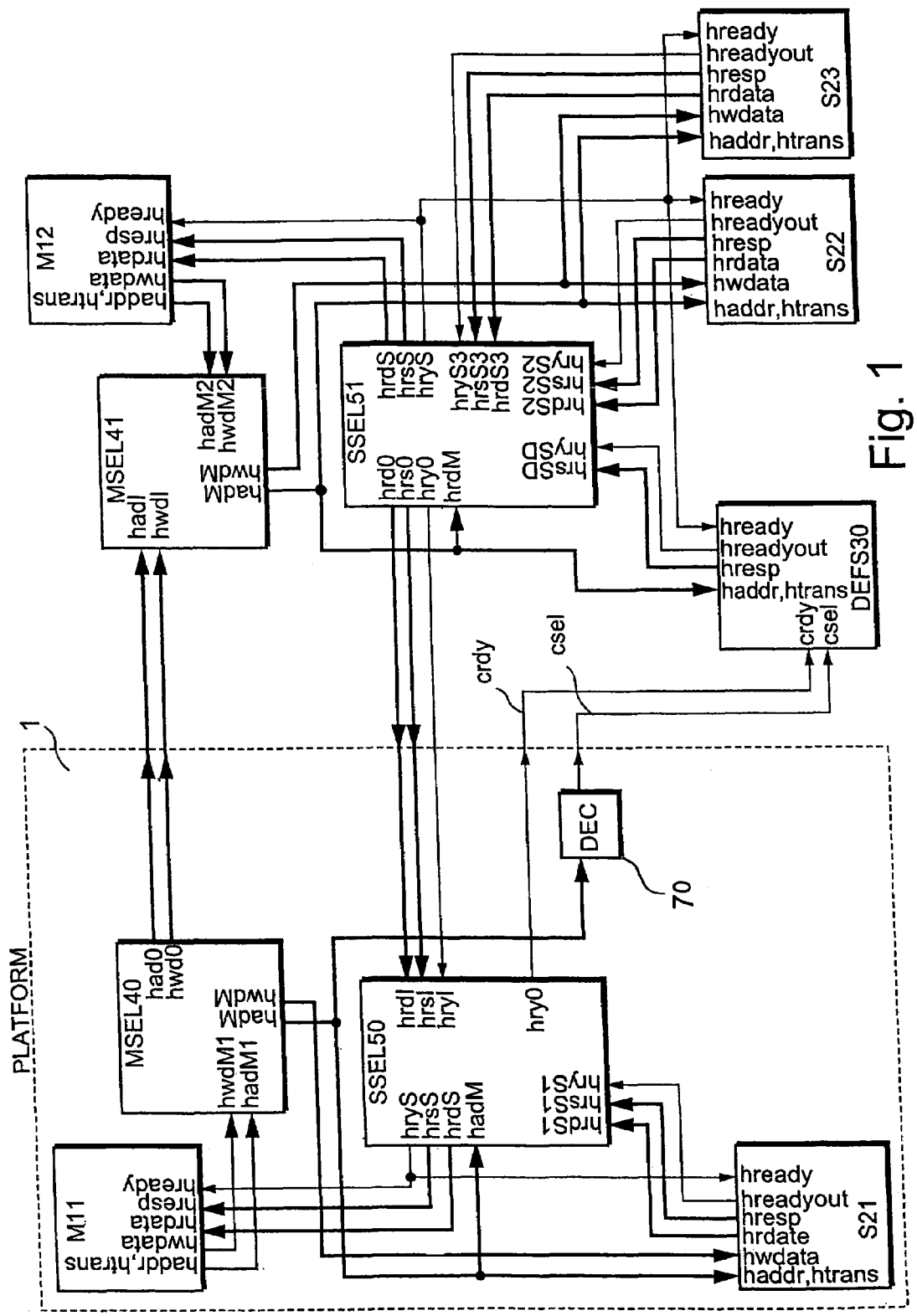
FIG. 1 is a block diagram showing a bus configuration circuit according to an embodiment of the present invention.
Figure 2:
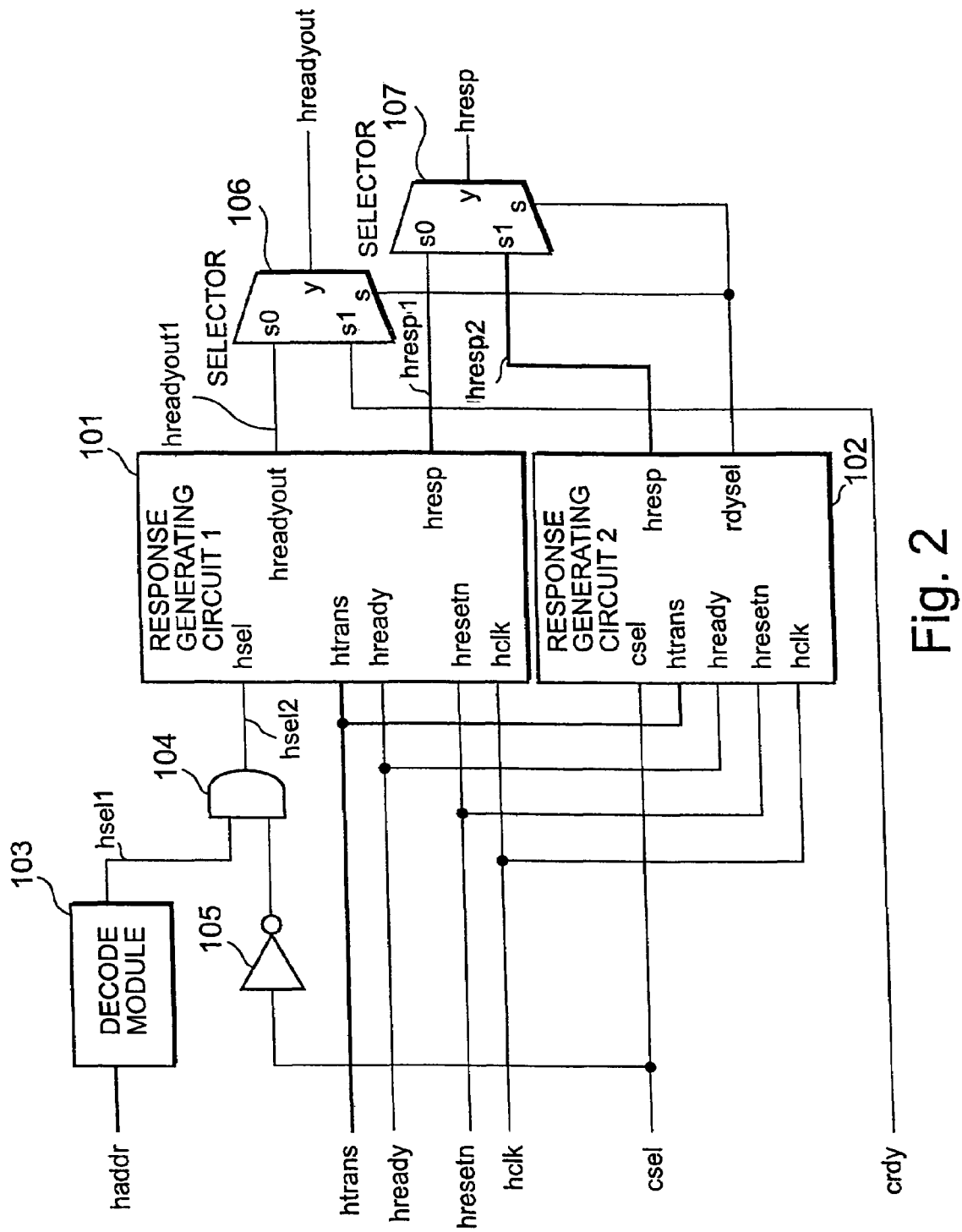
FIG. 2 is a block diagram of a DEFS of the bus configuration circuit according to the embodiment of the present invention.
Figure 3:
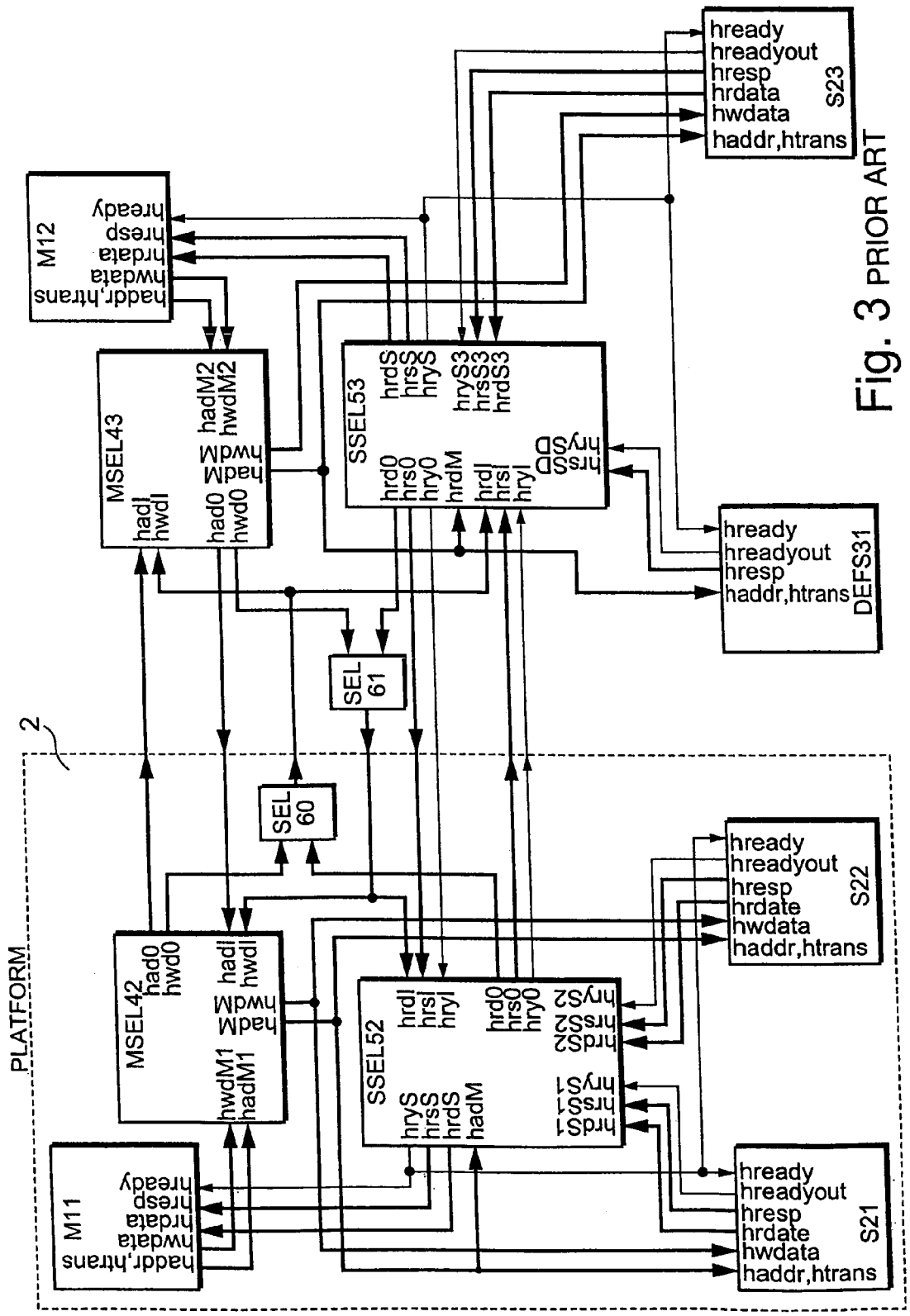
FIG. 3 is a block diagram of a conventional bus configuration circuit.

FIG. 1 is a block diagram of a bus configuration circuit according to an embodiment of the present invention. FIG. 2 is a detailed block diagram of a DEFS30.

A configuration of FIG. 1 will first be explained. M11 and M12 indicate master modules respectively. S21, S22, S23 and DEFS30 indicate slave modules respectively. MSEL40, MSEL41, SSEL50 and SSEL51 respectively indicate module groups that constitute buses. DEC70 indicates a decode module which identifies that an access destination from M11 corresponding to the master module lying within a platform 1 is intended for the corresponding slave module provided within the platform 1. An arbiter module is one of bus module groups, which arbitrates bus rights to the master modules M11 and M12. However, this is not shown in FIG. 1 and omitted therefrom.

The slave module S21 is controlled by the master module M11, and the slave modules S22, S23 and DEFS30 are respectively controlled by the master modules M11 and M12. The MSEL40 transmits data (such as address information, write information, etc.) sent from the master module M11 to the slave module S21 and the MSEL41. In response to data (such as address information, write information, etc.) sent from the master modules M12 and the MSEL40, the MSEL41 transmits the data to the slave modules S22, S23 and DEFS30. In response to data (such as read information, response information, etc.) sent from the slave modules S22, S23 and DEFS30, the SSEL51 transmits the data to the master module M12 and the SSEL50. In response to data (such as read information, response information, etc.) sent from the slave module S21 and the SSEL51, the SSEL50 sends the data to the master module M11.

In the example shown in FIG. 1, the master module M11 performs arithmetic operations and system control as typified by a CPU and includes a cache memory and a local memory as the case may be. The master module M12 is one as typified by a DMA controller or an I/O channel device or the like, or it is a CPU that performs arithmetic operations and system control, as typified by the CPU. The slave module S21 is such an I/O slave module as typified by I/O, which is controlled by the master module M11. The slave module S22 is such a memory slave module as typified by a system memory, a shared memory, a main memory or the like, which is controlled by the master modules M11 and M12. The slave module S23 is such an I/O slave module as typified by I/O, which is controlled by the master modules M11 and M12. The DEFS30 is a default slave module which is assigned to an address space distinct from an address space assigned to each of the slave modules S22 and S23 and performs a response to access from the corresponding master module to an address space distinct from the address spaces assigned to the slave modules S22 and S23. Since the DEFS30 is assigned to the address distinct from the addresses for the slave modules S22 and S23, the DEFS30 might become similar to an address for the slave module S21.

Each of the master modules M11 and M12 outputs an htrans signal indicative of a transfer type of an access cycle, an haddr signal indicative of an address and an hwdata signal indicative of write data, and has input thereto an hrdata signal indicative of read data, an hresp signal indicative of a response type and an hready signal indicative of response ready. Each of the slave modules S21, S22 and S23 has input thereto the htrans signal indicative of the transfer type of the access cycle, the haddr signal indicative of the address, the hwdata signal indicative of the write data, and an hready signal indicative of response ready of other slave, and outputs an hrdata signal indicative of read data, an hresp signal indicative of a response type and an hreadyout signal indicative of response ready of each slave itself. The htrans signal, haddr signal, hwdata signal, hrdata signal and hresp signal are signals for buses constituted by a plurality of signal lines.

Although the respective master modules and the respective slave modules respectively input and output AHB signals other than the above, only typical signals are used in the description in the present invention. The platform 1 comprises the master module M11, the slave module S21, the bus modules MSEL40 and SSEL50 and the decode module DEC70. The bus module MSEL40 has input thereto the haddr signal, htrans signal and hwdata signal outputted from M11 corresponding to the master module lying in the platform 1 via a hadM1 terminal and an hwdM1 terminal, and selects the same according to bus rights. Further, the bus module MSEL40 outputs the same from an hadM terminal and an hwdM terminal to all of the slave module (S21 in the present embodiment), SSEL50 corresponding to the bus module and decode module DEC70 provided within the platform 1 and outputs the same from an hadO terminal and an hwdO terminal even to MSEL41 corresponding to the bus module provided outside the platform 1. The bus module MSEL41 has input thereto the haddr signals, htrans signals and hwdata signals respectively outputted from M12 corresponding to the master module located outside the platform 1 and MSEL40 corresponding to the bus module provided within the platform 1 via an hadM2 terminal, an hwdM2 terminal, an hadl terminal, and an hwdl terminal and selects the same according to bus rights and outputs the same from an hadM terminal and an hwdM terminal to S22, S23 and DEFS30 corresponding to the slave modules located outside the platform 1 and the SSEL51 corresponding to the bus module located outside the platform 1. The bus module SSEL50 has input thereto the hrdata signals, hresp signals, and hreadyout signals respectively outputted from S21 corresponding to the slave module lying in the platform 1 and SSEL51 corresponding to the bus module located outside the platform 1 via an hrdS1 terminal, an hrsS1 terminal, an hryS1 terminal, an hrdl terminal, an hrsl terminal and an hryl terminal, selects the same in accordance with an address signal inputted via an hadM terminal, and outputs the same from an hrdS terminal, an hrsS terminal and an hryS terminal to M11 corresponding to the master module located within the platform 1. However, the bus module SSEL50 has input thereto the hreadyout signals respectively outputted from the slave modules S21, S22, S23 and DEFS30 via the hryS1 terminal and the hryl terminal, selects the same in accordance with the address signal inputted via the hadM terminal, and outputs the selected one from the hryS terminal to M11 corresponding to the master module in the platform 1 as an hready signal and outputs it even to S21 corresponding to the slave module provided in the platform 1.

Also the bus module SSEL50 has input thereto the hreadyout signal outputted from the slave module S21 placed within the platform 1 via the hryS1 terminal, selects it in accordance with the address signal inputted via the hadM terminal and outputs the same from the hryO terminal to the DEFS30 as a crdy signal. The bus module SSEL51 has input thereto the hrdata signals, hresp signals, and hreadyout signals respectively outputted from the slave modules S22, S23 and DEFS30 provided outside the platform 1 via an hrdS2 terminal, an hrsS2 terminal, an hryS2 terminal, an hrdS3 terminal, an hrsS3 terminal, an hryS3 terminal, an hrsSD terminal and an hrySD terminal, selects the same in accordance with an address signal inputted via an hadM terminal and outputs the same from an hrdS terminal, an hrsS terminal, an hryS terminal, an hrdO terminal, an hrsO terminal and an hryO terminal to M12 corresponding to the master module provided outside the platform 1 and SSEL50 corresponding to the bus module provided within the platform 1. However, the hreadyout signals respectively outputted from the slave modules S22, S23 and DEFS30 provided outside the platform 1 are input thereto via the hryS2 terminal, hryS3 terminal and hrySD terminal, selected in accordance with the address signal inputted via the hadM terminal and outputted from the hryS terminal and the hryO terminal to M12 corresponding to the master module provided outside the platform 1 and SSEL50 corresponding to the bus module provided within the platform 1 and even to S22, S23 and DEFS30 corresponding to the slave modules provided outside the platform 1 as hready signals. The decode module DEC70 determines, based on the corresponding address signal and bus right permitting signal (not shown) outputted from the MSEL40, whether the master module placed within the platform 1 has the bus right and the access destination of the master module M11 provided within the platform 1 corresponds to the slave module S21 provided within the platform 1, and outputs a select signal csel to the DEFS30 when the access destination corresponds to the slave module S21 provided within the platform 1.

A configuration of FIG. 2 will next be explained. An address decoder 103 decodes an address signal haddr to thereby determine whether the DEFS30 has been selected. When the DEFS30 is selected, the address decoder 103 outputs a select signal hsel1=H. An AND gate 104 has input thereto the hsel1 signal and the csel signal as inverted by a NOT gate 105, and outputs a select signal hsel2. A response generating circuit 101 has input thereto an htrans signal, an hready signal and an hsel2 signal and outputs an hreadyout1 signal from an hreadyout terminal and outputs an hresp1 signal from an hresp terminal in the case of access at the time that the hsel2 signal=H, thereby carrying out an access response. A response generating circuit 102 has input thereto the csel signal, htrans signal and hready signal and outputs an hresp2 signal from an hresp terminal and outputs a select signal rdysel=H from an rdysel terminal in the case of access at that time the csel signal=H. When the select signal rdysel=H, a selector 106 selects a crdy input signal and outputs it as an hreadyout signal. Further, a selector 107 selects the hresp2 signal and outputs it as an hresp signal. When the select signal rdysel=L, the selector 106 selects the hreadyout1 signal and outputs it as an hreadyout signal, and the selector 107 selects the hresp1 signal and outputs it as an hresp signal. Owing to these operations, the DEFS30 is operated in the following manner. When access to the corresponding address assigned to the DEFS30 is made when the csel signal=L, the hsel2 signal=H is reached, so that the response generating circuit 101 outputs access responses therefrom, whereas the response generating circuit 102 does not perform the access response because of the csel signal=L but outputs a select signal rdysel=L. Owing to the rdysel signal=L, the access responses outputted from the response generating circuit 101 are selected by the selector 106 and the selector 107 and outputted as an hreadyout signal and an hresp signal.

Also the DEFS30 is operated in such a manner that when access to the corresponding address assigned to the DEFS30 is made when the csel signal=H, the hsel2 signal=L is reached by the AND gate 104, so that the response generating circuit 101 makes no access response and instead the response generating circuit 102 performs access responses because the csel signal=H, and outputs an hresp2 signal and rdysel=H, and a crdy input signal and an access response outputted from the response generating circuit 102 are respectively selected by the selector 106 and the selector 107 in accordance with the rdysel signal=H and thereafter outputted as an hreadyout signal and an hresp signal.

An hresetn signal and an hclk signal respectively inputted to the response generating circuit 101 and the response generating circuit 102 are respectively a reset signal and a clock signal defined by the AHB. The DEFS30 outputs access responses in accordance with timings defined by the AHB, based on these signals.

Since internal detailed circuit configurations of the MSEL40, MSEL41, SSEL50 and SSEL51 shown in FIG. 1, and the response generating circuits 101 and 102 shown in FIG. 2 can be easily constituted if the AHB is understood, they are not shown here.

Figure 4:
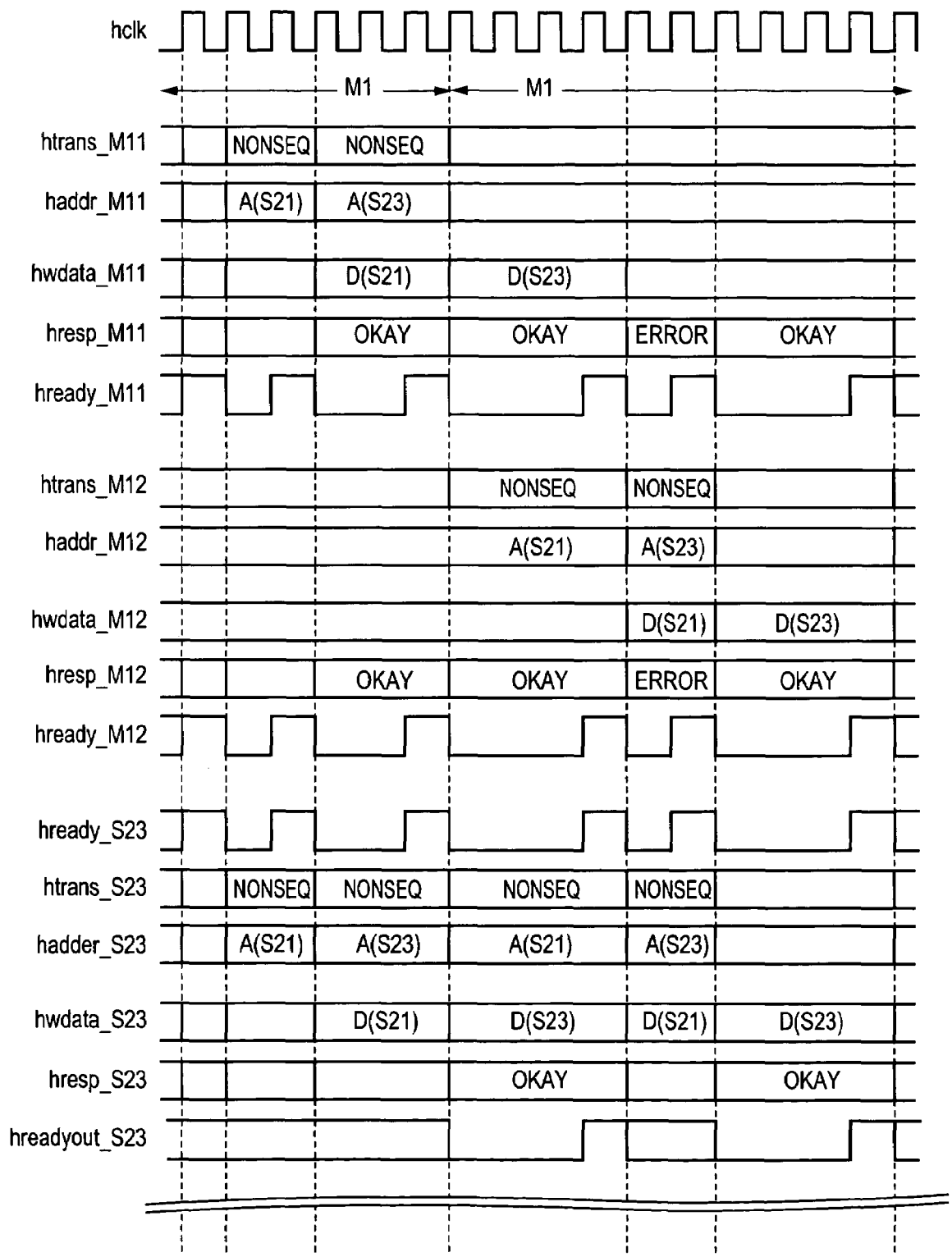
FIG. 4 is a timing chart of the bus configuration circuit according to the embodiment of the present invention.
Figure 5:
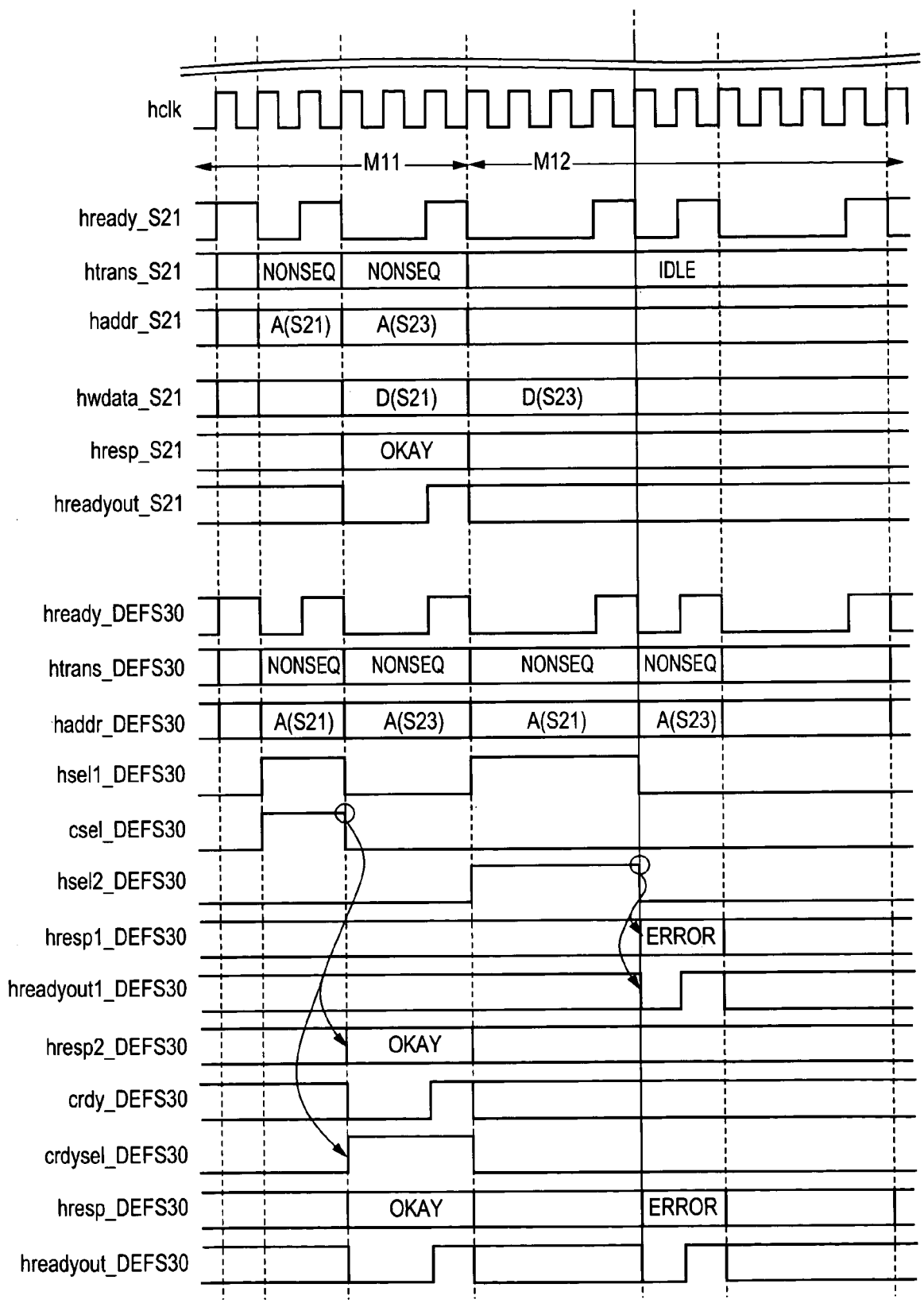
FIG. 5 is a timing chart of the bus configuration circuit according to the embodiment of the present invention.
Figure 6:
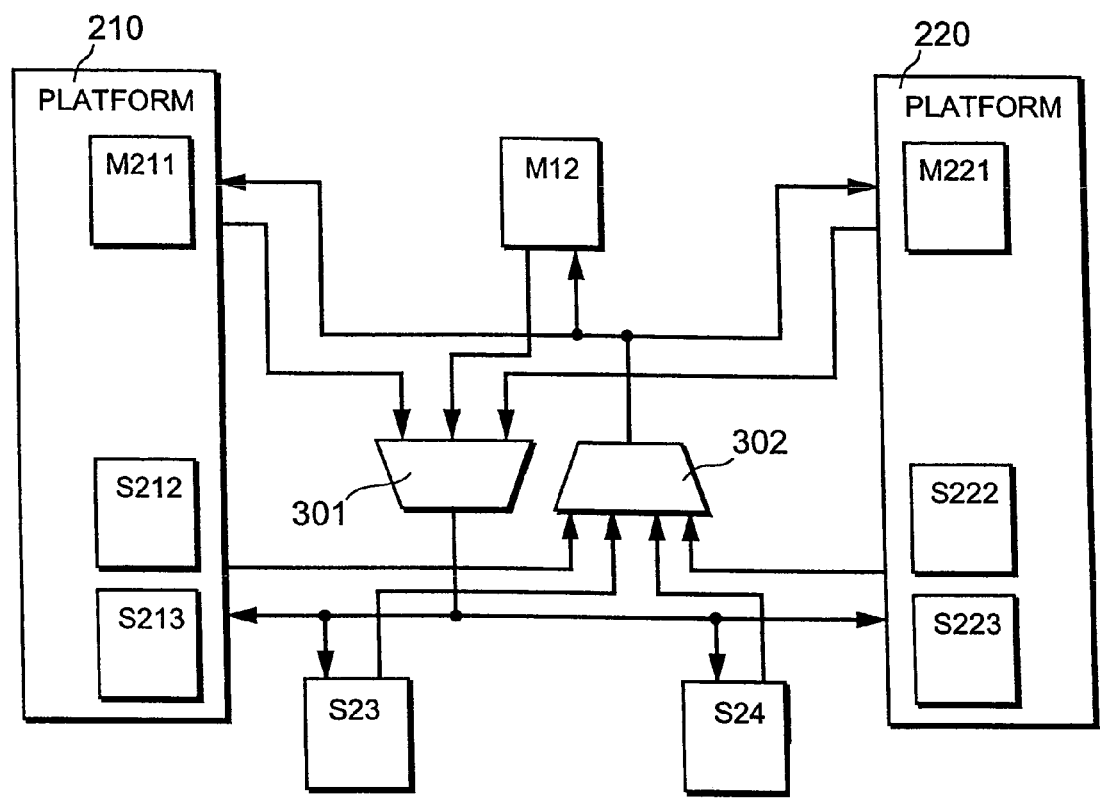
FIG. 6 is a schematic block diagram showing a configurational example of a multiprocessor.
Figure 7:
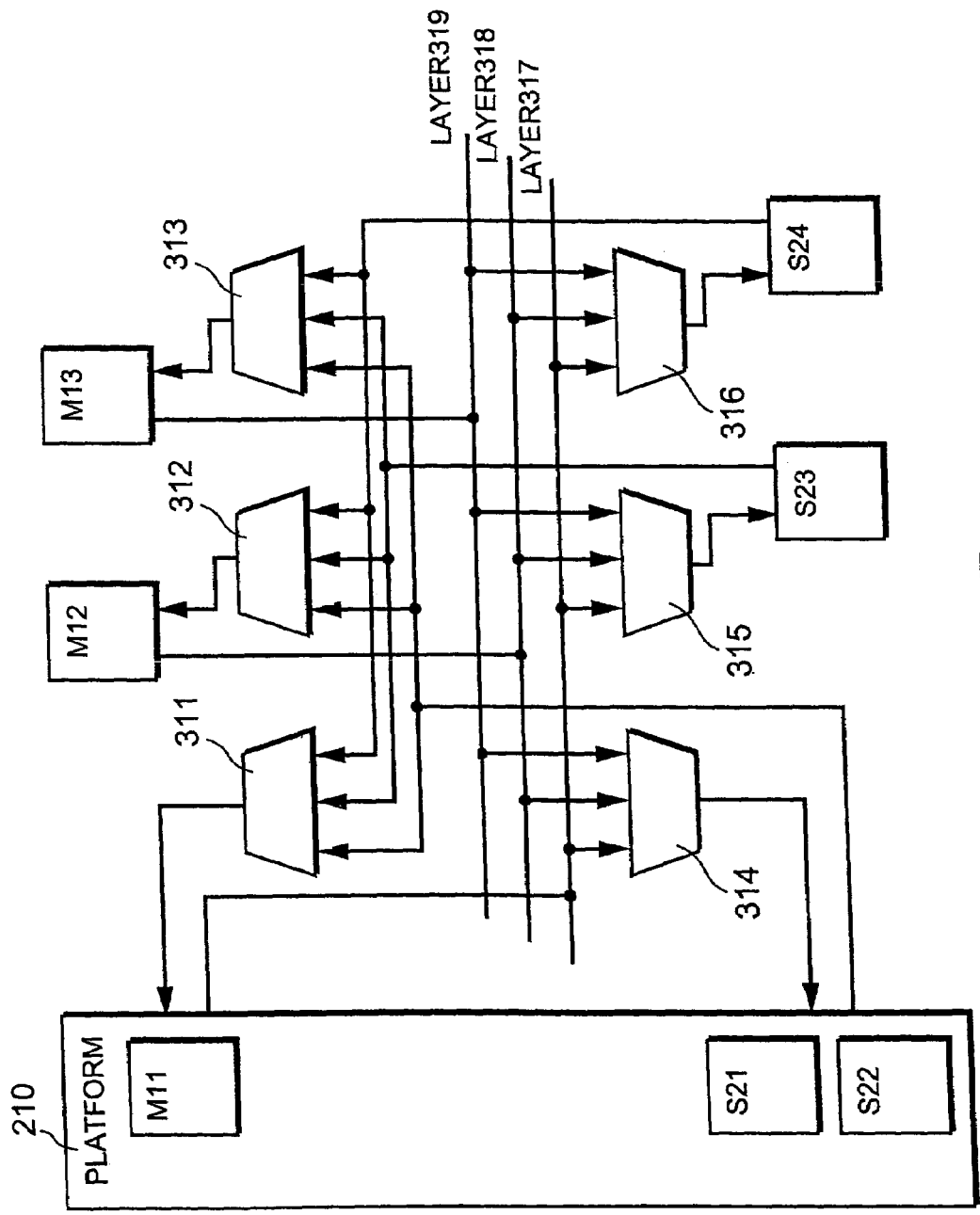
FIG. 7 is a schematic block diagram illustrating a configurational example of a multilayer AHB bus.

FIGS. 4 and 5 show timing charts employed in the embodiment of the present invention. The operation of the present embodiment will be explained below while taking as an example, a case in which four access cycles are carried out in order with reference to the timing charts shown in FIGS. 4 and 5.

The first access indicates a write access (hereinafter abbreviated as M11S21 access) from the master module M11 provided within the platform 1 to the slave module S21 provided within the platform 1. The second access indicates a write access (hereinafter abbreviated as M11S23 access) from the master module M11 provided within the platform 1 to the slave module S23 provided outside the platform 1. The third access indicates a write access (hereinafter abbreviated as M12S21 access) from the master module M12 provided outside the platform 1 to the slave module S21 provided within the platform 1. The fourth access indicates a write access (hereinafter abbreviated as M12S23 access) from the master module M12 provided outside the platform 1 to the slave module S23 provided outside the platform 1. Although the description of the operation has been made with the write accesses by way of example, the operation of the present embodiment is similarly performed except that write data is transferred from the master to the slave using n hwdata signal in the case of a data phase upon the write access, whereas read data from the slave module to the master module is transferred to the master module using an hrdata signal in the case of a data phase upon read access in a manner similar to an hresp signal, and the description of the operation will therefore be omitted. As to signal names, e.g., an htrans terminal signal of the M11 module is abbreviated like htrans_M11. Since no access is made to the slave module S22, the operation is omitted in terms of the timing charts.

Since the AHB is operated in synchronism with the rising edge of a clock signal hclk, the output signals produced from the respective modules are outputted in synchronism with the rising edge of the clock signal hclk, and the signals inputted to the respective modules are taken or fetched in synchronism with the rising edge of the clock signal hclk and used. Since the access is divided into an address phase and a data phase in the AHB, the pipelined two phases perform one transfer. The respective phases of the AHB access are started after being subjected to assertion of an hready signal indicative of the end of each phase of its immediately preceding access.

An address phase of the M11S21 access is started after being subjected to assertion of an hready_M11 signal indicative of the end of an address phase of its immediately preceding access. In the address phase thereof, the master module M11 outputs a transfer type signal htrans_M11=NONSEQ and an address signal haddr_M11=A(S21) to the slave module S21.

A(S21) indicates that an address signal corresponds to the corresponding address of the slave module S21. D(S21) of the write data signal indicates write data with respect to the slave module S21. NONSEQ of the transfer type signal htrans is indicative of performing an NONSEQUENTIAL access defined by AMBA specs, and IDLE is indicative of carrying out an IDLE cycle. OKAY of the response signal hresp indicates that the access defined by the AMBA specs is normally completed, and ERROR thereof indicates the abnormal completion of access. When access is generally made to a slave nonexistent address, the response signal hresp=ERROR is reached.

Since the master module M11 has the bus right upon the M11S21 access, the htrans_M11=NONSEQ and haddr_M11=A(S21) outputted from the M11 are transmitted to the DEC70, S21, S22, S23 and DEFS30 via the MSEL40 or the MSEL40 and MSEL41 in the address phase of the access. Since the M11S21 access corresponds to the access from the master module M11 provided within the platform 1 to the slave module S21 provided in the platform 1, the DEC70 outputs csel=H during the address phase of the M11S21 access. When an hready_M11 signal indicative of the completion of the address phase of the M11S21 access, i.e., the completion of a data phase of the access just prior to the M11S21 access is asserted, the data phase of the M11S21 access is started and at the same time the address phase of the next M11S23 access is also stated. During the data phase of the M11S21 access, the write data signal hwdata_M11=D(S21) from the master module M11 to the slave module S21 is transmitted to the slave modules S21, S22 and S23 via the MSEL40 or the bus modules MSEL40 and MSEL41. The slave module S21 recognizes, based on a transfer type signal htrans_S21=NONSEQ, an address signal haddr_S21=A(S21) and an address phase end signal hready_S21=H transferred upon the address phase of the M11S21 access, that the slave module S21 per se has been accessed, fetches therein write data hwdata_S21=D(S21) transferred upon the data phase of the M11S21 access, and outputs a signal hreadyout_S21=H indicative of the completion of the data phase and a response signal hresp_S21=OKAY. During the data phase of the M11S21 access, the response signal hresp_S21=OKAY outputted from the slave module S21 is transmitted to the master module M11 via the bus module SSEL50. On the other hand, the ready signal hreadyout_S21 is transmitted to the hready terminals of the master module M11 and the slave module S21 via the bus module SSEL50 and to the crdy terminal of the default slave module DEFS30 as a crdy signal. The master module M11 terminates the data phase of the M11S21 cycle in accordance with the transmitted ready signal hready_M11=H. At the same time, the address phase of the M11S23 access is ended, and the data phase of the M11S23 access and the address phase of the next M12S21 access are started.

The default slave module DEFS30 recognizes, based on a transfer type signal htrans_DEFS=NONSEQ, an address signal haddr_DEFS=A(S21) and an address phase end signal hready_DEFS=H transmitted upon the address phase of the M11S21 access, that the default slave module DEFS30 per se has been accessed. Since, however, csel=H, the response generating circuit 101 lying in the DEFS30 does not respond and instead the response generating circuit 102 responds. Thus, the default slave module DEFS30 outputs an hreadyout_DEFS=crdy and an hresp DEFS=OKAY upon the data phase of the M11S21 access. During the data phase of the M11S21 access, the response signal hresp_DEFS=OKAY outputted from the default slave module DEFS30 is transmitted to the master module M12 via the bus module SSEL51. On the other hand, the ready signal hreadyout_DEFS is transmitted to its corresponding hready terminals of the master module M12, slave modules S22 and S23 and default slave module DEFS30 via the bus module SSEL51. Since the hreadyout_S21 outputted from the slave module S21 is transmitted to the hready terminals of all the slave modules and all the master modules during the data phase of the M11S21 access owing to the above operations, the master and slave modules M12 and S22 and S23 provided outside the platform 1 are capable of recognizing the completion of the cycle during which the access from the master module M11 provided within the platform 1 to the slave module S21 provided within the platform 1 is made.

Next, since the master module M11 has the bus right upon the M11S23 access, an htrans_M11=NONSEQ and an haddr_M11=A(S23) outputted from the master module M11 to the slave module S23 are transmitted to the decode module DEC70, slave modules S21, S22, S23 and default slave module DEFS30 via the bus module MSEL40 or the bus modules MSEL40 and MSEL41 upon the address phase of the access. Since the M11S23 access is equivalent to the access from the corresponding master module provided within the platform 1 to the corresponding slave module provided outside the platform 1, the decode module DEC70 outputs csel=L during the address phase of the M11S23 access. When the hready_M11 signal indicative of the completion of the address phase of the M11S23 access, i.e., the end of the data phase of the M11S21 access is asserted, the data phase of the M11S23 access is started and at the same time the address phase of the following M12S21 access is also started. During the data phase of the M11S23 access, a write data signal hwdata_M11=D(S23) outputted from the master module M11 to the slave module S23 is transmitted to the slave modules S21, S22 and S23 via the MSEL40 or the bus modules MSEL40 and MSEL41. The slave module S23 recognizes, based on a transfer type signal htrans_S23=NONSEQ, an address signal haddr_S23=A (S23) and an address phase end signal hready_S23=H transferred upon the address phase of the M11S23 access, that the slave module S23 per se has been accessed, fetches therein write data hwdata_S23=D(S23) transferred upon the data phase of the M11S23 access, and outputs a signal hreadyout_S23=H indicative of the completion of the data phase and a response signal hresp_S23=OKAY. During the data phase of the M11S23 access, the response signal hresp_S23=OKAY outputted from the slave module S23 is transmitted to the master modules M12 and M11 via the SSEL51 or the bus modules SSEL51 and SSEL50. On the other hand, the ready signal hreadyout_S23 is transmitted to the hready terminals of the master module M12, the slave modules S22 and S23 and the default slave module DEFS30 and the master module M11 and slave module S21 via the bus module SSEL51 or the bus modules SSEL51 and SSEL50. The master module M11 terminates the data phase of the M11S23 cycle in accordance with the transmitted ready signal hready_M11=H. Simultaneously with it, the address phase of the M12S21 access is ended, and the data phase of the M12S21 access and the address phase of the next M12S23 access are started. The default slave module DEFS30 recognizes, based on a transfer type signal htrans_DEFS=NONSEQ, an address signal haddr_DEFS=A (S23) and an address phase end signal hready_DEFS=H transmitted upon the address phase of the M11S23 access, that the default slave module DEFS30 per se has not been accessed, and does not respond.

Next, since the master module M12 has the bus right upon the M12S21 access, an htrans_M12=NONSEQ and an haddr_M12=A(S21) outputted from the master module M12 are transmitted to the slave modules S22 and S23 and the default slave module DEFS30 via the bus modules MSEL41 upon the address phase of the access. Since it can be judged by the bus right that the M12S21 access is equivalent to the access from the corresponding master module provided outside the platform 1, the decode module 70 outputs csel=L and the bus module MSEL40 outputs an IDLE signal from the corresponding hadM terminal as an htrans signal during the address phase of the M12S21 access, thereby resulting in htrans_S21=IDLE. When an hready_M12 signal indicative of the end of the address phase of the M12S21 access, i.e., the completion of the data phase of the M11S23 access is asserted, the data phase of the M12S21 access is started and at the same time the address phase of the following M12S23 access is also started. During the data phase of the M12S21 access, a write data signal hwdata_M12=D(S21) outputted from the master module M12 to the slave module S21 is transmitted to the slave modules S22 and S23 via the bus module MSEL41. The slave module S21 recognizes, based on the transfer type signal htrans_S21=IDLE, and the address phase end signal hready_S21=H transferred upon the address phase of the M12S21 access, that the slave module S21 per se has not been accessed and does not respond.

On the other hand, the default slave module DEFS30 recognizes, based on a transfer type signal htrans_DEFS=NONSEQ, an address signal haddr_DEFS=A (S21) and an address phase end signal hready_DEFS=H transmitted upon the address phase of the M12S21 access, that the default slave module DEFS30 per se has been accessed. Since, however, csel_DEFS=L, the response generating circuit 102 lying in the DEFS30 does not respond and the response generating circuit 101 responds. Thus, the default slave module DEFS30 outputs a signal hreadyout_DEFS=H indicative of the error completion of the data phase at the data phase of the M12S21 access, and a response signal hresp_DEFS=ERROR. During the data phase of the M12S21 access, the response signal hresp_DEFS=ERROR outputted from the default slave module DEFS30 is transmitted to the master modules M12 and M11 via the bus module SSEL51 or the bus modules SSEL51 and SSEL50. On the other hand, the ready signal hreadyout_DEFS is transmitted to its corresponding hready terminals of the master module M12, slave modules S22 and S23 and default slave module DEFS30, and the master modules M11 and slave module S21 via the bus module SSEL51 or the bus modules SSEL51 and SSEL50. The master module M12 terminates the data phase of the M12S21 cycle in accordance with the transmitted ready signal hready_M12=H. Simultaneously with it, the address phase of the M12S21 access is ended and hence the data phase of the M12S23 access and the address phase of the following further M12S23 access are started (it corresponds to the virtual fifth access employed in the present embodiment).

Next, since the master module M12 has the bus right upon the M12S23 access, an htrans_M12=NONSEQ and an haddr_M12=A(S23) outputted from the master module M12 are transmitted to the slave modules S22 and S23 and the default slave module DEFS30 via the bus modules MSEL41 upon the address phase of the access. Since it can be judged by the bus right that the M12S23 access is equivalent to the access from the corresponding master module provided outside the platform 1, the decode module DEC70 outputs csel=L and the bus module MSEL40 outputs an IDLE signal from the corresponding hadM terminal as an htrans signal during the address phase of the M12S23 access, thereby resulting in htrans_S21=IDLE. When an hready_M12 signal indicative of the end of the address phase of the M12S23 access, i.e., the completion of the data phase of the M11S21 access is asserted, the data phase of the M12S23 access is started and at the same time the address phase of the following M12S23 access is also started. During the data phase of the M12S23 access, a write data signal hwdata_M12=D(S23) outputted from the master module M12 to the slave module S23 is transmitted to the slave modules S22 and S23 via the bus module MSEL41. The slave module S21 recognizes, based on the transfer type signal htrans_S21=IDLE, and the address phase end signal hready_S21=H transferred upon the address phase of the M12S23 access, that the slave module S21 per se has not been accessed and does not respond. The default slave module DEFS30 recognizes, based on the transfer type signal htrans_DEFS=NONSEQ, address signal haddr_DEFS=A(S23) and address phase end signal hready_DEFS=H transmitted upon the address phase of the M12S23 access, that the default slave module DEFS30 per se has not been accessed, and does not respond.

On the other hand, the slave module S23 recognizes, based on a transfer type signal htrans_S23=NONSEQ, an address signal haddr_S23=A(S23) and an address phase end signal hready_S23=H transmitted upon the address phase of the M12S23 access, that the slave module S23 itself has been accessed. Further, the slave module S23 fetches write data hwdata_S23=D(S23) transmitted upon the data phase of the M12S23 access and outputs a signal hreadyout_S23=H indicative of the completion of the data phase and a response signal hresp_S23=OKAY. During the data phase of the M12S23 access, the response signal hresp_S23=OKAY outputted from the slave module S23 is transmitted to the master modules M12 and M11 via the bus module SSEL51 or the bus modules SSEL51 and SSEL50. On the other hand, the ready signal hreadyout_S23 is transmitted to its corresponding hready terminals of the master module M12, slave modules S22 and S23 and default slave module DEFS30, and the master modules M11 and slave module S21 via the bus module SSEL51 or the bus modules SSEL51 and SSEL50. The master module M12 terminates the data phase of the M12S23 cycle in accordance with the transmitted ready signal hready_M12=H. Simultaneously with it, the address phase of access following the M12S23 access is ended and hence the data phase of the M12S23 access and the address phase of the following further access are started. Although various signals are used for the AHB even other than the signals described above, they are not shown in FIGS. 1 through 10.

According to the present embodiment of the present invention as described above, the corresponding master module and slave module outside the platform 1 are capable of recognizing, through the crdy signal, the completion of the cycle in which the corresponding master module provided within the platform 1 is accessed to the corresponding slave module provided within the platform 1. It is therefore possible to configure a bus in the form that, for example, S22 corresponding to the slave module accessed by both of the master module provided within the platforms and the master module provided outside the platform 1 is disposed outside the platform 1 and signals lines extended from the master module provided outside the platform 1 to the corresponding slave module provided within the platform 1 are eliminated. Owing to such a configuration, the address overlapping of the slave modules provided within the platform 1, which has been turned into a problem, is solved and normal operating environments can be provided.

Since no signal lines exist where the master module provided outside the platform 1 is used for access to the corresponding slave module provided within the platform 1, the slave modules provided within the platform 1 are not accessed. In this case, the default slave module DEFS30 responds through the use of a signal indicative of an ERROR as an alternative to the above. Thus, since the bus rights in the platform 1 exist only in the master module provided within the platform 1, a wait for arbitration between the bus rights in the platform 1 does not occur.

Similarly, owing to the elimination of signal lines (e.g., haddr, htrans, hwdata and hrdata) extending from the master module provided outside the platform 1 to the corresponding slave module provided within the platform 1, the signal lines and signal line terminals are reduced in number where the design of the platform has been realized, whereby it can be expected that the areas and power consumption of the platform 1 and the bus configuration circuit can be less reduced.

While the present invention has been described with reference to the illustrative embodiment, this description is not intended to be construed in a limiting sense. Various modifications of the illustrative embodiment will be apparent to those skilled in the art on reference to this description. It is therefore contemplated that the appended claims will cover any such modifications or embodiments as fall within the true scope of the invention.

What is claimed is:

1. A bus configuration circuit, comprising:
 a first group that consists of a first master module, a first slave module controlled by the first master module, a first bus module group that connects the first master module and the first slave module, and a decoder connected to the first bus module group, the first group disposed within a first platform;
 a second master module and a second slave module disposed outside the first platform and connected to the first group via the first bus module group by a second bus module group, the second bus module group disposed outside the first platform,
 a first control signal output from the decoder within the first bus module group, the first control signal indicative of whether an access destination of the first master module corresponds to the first slave module;
 a second control signal output from the first slave module through the first bus module group and indicative of accessed status of the first slave module; and
 a third slave module disposed outside the first platform and that receives the first and second control signals,
 the third slave module including a selector that selectively outputs one of the second control signal and an internally generated signal as a third control signal to the first master module, the second master module, the first slave module and the second slave module via the second bus module group and the first bus module group, responsive to the first control signal and the second control signal.

2. A bus configuration circuit according to claim 1, wherein the third slave module outputs the second control signal as the third control signal in accordance with the first control signal outputted when the first master module obtains access to the first slave module.

3. A bus configuration circuit according to claim 2, further comprising additional groups each respectively including a master module, a slave module and a bus module group.

4. A bus configuration circuit according to claim 1, further comprising additional groups each respectively including a master module, a slave module and a bus module group.

5. A bus configuration circuit of claim 1, wherein when the first control signal has a first logic value, the third slave module generates a first signal responsive to a transfer type of an access cycle and a ready state of the first and second slave modules, and outputs the internally generated first signal as the third control signal, and
 when the first control signal has a second logic value, the third slave module outputs the second control signal as the third control signal.

6. A bus configuration circuit, comprising:
 a first group that consists of a first master module, a first slave module controlled by the first master module, and a first bus module group that connects the first master module and the first slave module, the first group disposed within a first platform;

a second master module and a second slave module disposed outside the first platform and connected to the first group via the first bus module group by a second bus module group, the second bus module group disposed outside the first platform;

a first control signal output from the first bus module group according to whether an access destination of the first master module corresponds to the first slave module;

a second control signal output from the first slave module through the first bus module group and indicative of accessed status of the first slave module; and a third slave module disposed outside the first platform and coupled to receive the first and second control signals, that outputs a third control signal to the second master module and the second slave module directly via the second bus module group, and that outputs the third control signal to the first master module and the first slave module via the second bus module group followed by the first bus module group, responsive to the first control signal and the second control signal.

7. A bus configuration circuit according to claim 6, wherein the third slave module outputs the second control signal as the third control signal in accordance with the first control signal outputted when the first master module obtains access to the first slave module.

8. A bus configuration circuit according to claim 7, further comprising additional groups each respectively including a master module, a slave module and a bus module group.

9. A bus configuration circuit according to claim 6, further comprising additional groups each respectively including a master module, a slave module and a bus module group.

* * * * *